March 24, 1931. O. U. ZERK 1,797,280
LUBRICATING APPARATUS
Filed July 22, 1927
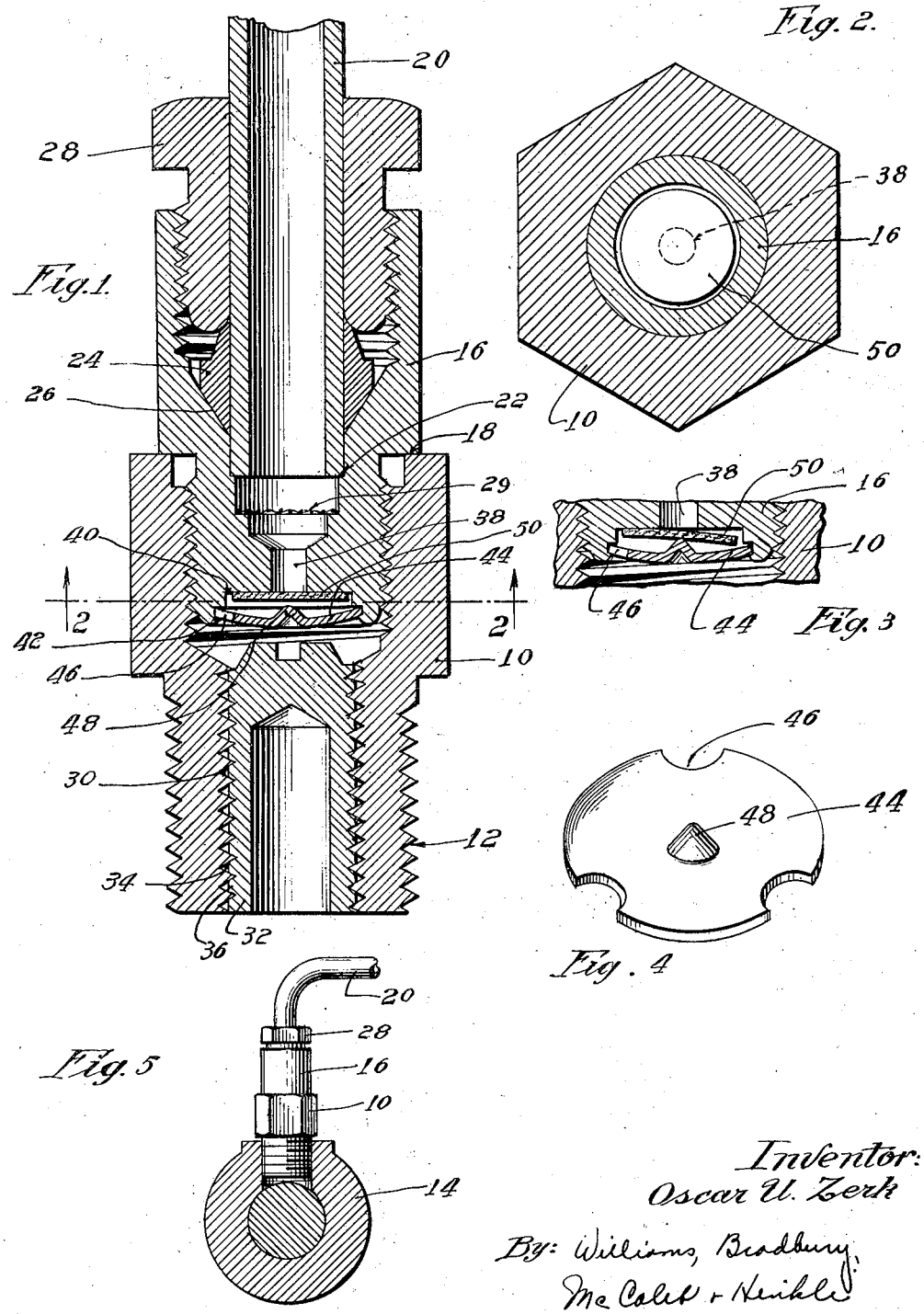
Inventor:
Oscar U. Zerk
By: Williams, Bradbury,
McCalet + Henkle
Atty's.

Patented Mar. 24, 1931

1,797,280

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed July 22, 1927. Serial No. 207,609.

My invention relates to lubricating apparatus, and is more specifically concerned with the check valves located adjacent the bearings and in juxtaposition to the flow control means of a centralized lubricating system.

Lubricating systems of the so-called centralized type comprise, in general, a lubricant reservoir or other suitable source of supply, pumping means for forcing the lubricant from the reservoir through conduits to the bearings to be lubricated, resistance units or other flow control devices, one placed adjacent each bearing to regulate the amount of lubricant supplied thereto, and check valves associated with said resistance units or flow control devices to prevent siphoning of oil from a higher to a lower bearing.

The check valves heretofore used in centralized lubricating systems have all included a spring for maintaining the valve upon its seat. Unless a great deal of care and time is expended, these springs cannot be made of uniform strength with the result that all of the check valves will not open simultaneously and where a check valve having a weak spring is applied to a bearing having a low resistance, it frequently happens that this bearing receives an undue proportion of the oil supplied to the system, or in extreme cases this bearing may receive all of the oil and the other bearings offering higher resistances and having check valves with stronger springs will receive substantially no lubricant.

It is an object of my invention to eliminate these difficulties by providing a springless check valve.

Another object is to provide a check valve which is simple and economical to manufacture.

Another object is to provide a valve which is capable of adjusting itself to produce an effective seal when there is dirt on the valve seat.

Another object is to provide a check valve which is free from parts which are liable to get out of order.

Another object is to provide a new and improved check valve for centralized lubricating systems.

Other objects and advantages will appear as the description proceeds.

In the drawings:

Figure 1 is a sectional elevation, on an enlarged scale, of a resistance unit having my new and improved valve located therein;

Figure 2 is a section on the line 2—2 of Figure 1;

Figure 3 is a partial section similar to Figure 1 and showing my valve in a different position;

Figure 4 is a perspective of the limiting washer shown in section in Figures 1 and 3; and Figure 5 shows the manner in which the resistance unit is attached to a bearing, the bearing being shown in cross section.

Referring to the drawings, the resistance unit comprises a terminal sleeve 10 having pipe threads 12 for securing it to a bearing, such as indicated at 14 in Figure 5. An intermediate sleeve 16 is threaded to the terminal sleeve 10 by machine threads, an abutment shoulder being provided at 18. The sleeve 16 receives the end of the conduit 20 which abuts a stop 22 and is clamped in place by the clamping ring 24, pinched between a conical surface 26 on the sleeve 16 and the end of the clamping nut 28. A wire screen 29 is usually provided to remove impurities from the lubricant prior to its passage through the resistance unit.

The lower portion of the terminal sleeve 10 is provided with an interiorly threaded cylindrical part 30 in which is located a resistance plug 32. The interior threads 34 of the part 30 are preferably V-shaped, while the resistance plug 32 is provided with partial threads 36 which cooperate with the threads 34 to provide a restricted spiral passage through which the oil must pass.

Located in the lower end of the sleeve 16 and just above the plug 32 is the new and improved check valve which constitutes my invention. The sleeve 16 is provided with a small passage 38 which terminates at the valve seat 40 located at its lower end. This valve seat is located in a cylindrical pocket formed in the end of the sleeve 16, the sides of the pocket being provided with a shoulder 42 against which is clamped a limiting washer 44 which is held in place by the swaged over end of the sleeve 16. This washer is provided with notches 46 which provide communication between opposite sides of the washer; and the central portion of the washer is pressed inwardly to provide a conical projection 48 which extends to a point adjacent the end of the passage 38.

Between the limiting washer 44 and the valve seat 40 is located a freely floating valve 50 which preferably comprises a fabric disc slightly smaller in diameter than the diameter of the pocket in which it is located. The fabric which I have found most satisfactory is a fine silk known as empire cloth, coated with linseed oil, oxidized and hardened. In this cloth the fabric is very diaphanous, functioning primarily as a binder for the linseed oil. This fabric is readily punched into discs and is water proof, oil proof and does not age or stiffen.

The operation of my new and improved valve is as follows: When lubricant is being forced to the bearings from the pump means (not shown), the valve disc 50 is in the position shown in Figure 3, being supported at an angle by the single central projection 48 formed on the limiting washer 44. In this position, free communication is provided between the passage 38 and the chamber in which the valve is located. As soon as the flow of lubricant to the bearings ceases and a siphoning action between a higher and lower bearing is set up, the decrease in pressure in the passage 38 and the slight back flow of lubricant therethrough, immediately causes the valve disc 50 to assume the position shown in Figure 1 and effectively cut off communication between the passage 38 and the valve chamber.

The quick return of the valve disc 50 to closed position is greatly facilitated by the employment of a projection, or projections, such as 48 which permit the high pressure existing in the system between the valve and the bearing, to act on the full underside of the valve disc and quickly force the disc against its seat. The use of a single central projection 48 has the further advantage of causing the valve disc 50 to assume a diagonal position relative to its seat during the flow of lubricant to the bearings. Such diagonal position is extremely desirable as it has been found that with the same opening through the valve, the valve returns to its seat more quickly from a diagonal position than from a position in which the valve is parallel to its seat.

My new and improved valve has the further advantage of effecting a leak-proof seal even when there is a slight accumulation of dirt on the valve seat. This desirable result is due to the flexibility of the empire cloth which, while sufficiently strong to withstand the difference in pressure on those parts of its sides which are in line with the passage 38, is sufficiently flexible to have its central part drawn slightly into the end of the passage 38, thus effecting a seal with the edge formed at the intersection of the valve seat and the end of the passage 38. This seal is independent of any seal which may be effected between the flat part of the valve seat and that part of the valve disc adjacent thereto.

In the operation of my invention, the chamber above the resistance plug 32 and in the upper end of which my new and improved valve is located, usually is partially filled with air, thus presenting ideal conditions for the phenomenon of capillary attraction and permitting the use of this phenomenon for closing the valve irrespective of any back flow of lubricant through the conduit. The attraction between the molecules of the lubricant and the molecules of the valve disc and valve seat causes the lubricant to adhere to the upper surface of the valve disc and the surface of the valve seat and to extend along the diverging parts of these surfaces when the valve is moved to the open position shown in Figure 3, as by the forcing of a quantity of lubricant to the bearing adjacent the valve. The surface tension of the lubricant causes it to draw the downwardly extending part of the valve disc toward the valve seat, and effect a lubricant-tight seal therebetween which may be entirely independent of any suction effect due to back flow of lubricant through the conduit in which the valve is located.

The force which draws the upper surface of the valve disc 50 against the valve seat, applies equally to all parts of the valve disc which are directly under the valve seat, and this force, together with the flexibility of the valve disc 50, result in the valve disc flexing sufficiently to form a tight seal around any particles of dirt which may be on the valve seat.

The feature of my valve which causes it to form a tight seal independently of any back flow which may exist in the conduit in which it is located, is important in that it results in the valve effecting a lubricant-tight seal even when the back flow or siphoning action in the conduit is of so extremely minute a character as to produce insufficient suction effect to itself close the valve.

Having thus illustrated and described a preferred embodiment of my invention, what I claim and desire to secure by United States Letters Patent is:

1. In a lubricating system, a check valve comprising, in combination, a conduit member having an opening therethrough and a valve seat at one end of said opening, a shoulder formed in said member adjacent said valve seat, a limiting member abutting said shoulder, a conical projection on said limiting member extending toward the opening in said conduit member, and a freely floating valve between said seat and said limiting member, said valve comprising a disc of silk fabric coated with oxidized oil.

2. In a lubricating system, a check valve, comprising, in combination, a conduit member having a recess terminating in a valve seat, a shoulder formed in said member adjacent said seat, a limiting member abutting said shoulder and having openings therethrough, a conical projection on said limiting member located centrally of said valve seat and extending toward said seat and above said openings, and a freely moving valve between said seat and said limiting member and beneath said seat.

3. In a lubricating system, a check valve comprising, in combination, conduit means including a valve seat, a freely movable valve for cooperating with said seat, said valve comprising a disc of silk fabric coated with oxidized oil, and means for limiting the movement of said valve from its seat.

4. A check valve for lubricating systems, comprising, in combination, a valve seat having a small opening therethrough and a fabric disc adapted to be held against said seat solely by the capillary action of the lubricant, said fabric disc being sufficiently strong to withstand hydraulic pressure over the area of said opening and sufficiently flexible to encircle and form a tight seal around dirt particles which may be deposited on said seat by the lubricant.

5. In a lubricating system, a check valve, comprising, in combination a conduit member having a valve seat, a limiting member adjacent said seat, and a freely floating valve between said seat and said member, said valve adapted normally to be held against said seat solely by the capillary action of the lubricant.

6. In a lubricating system comprising a source of lubricant supply, pump means, and conduits leading from said pump means to the bearings to be lubricated; a check valve including a valve seat and a freely floating valve, said valve normally being held against its seat by the capillary action of the lubricant and adapted to be forced from its seat by the pressure created by said pump means.

7. In a lubricating system, a check valve comprising, in combination, a conduit member having a valve seat, a freely floating valve normally held against said seat by the capillary action of the lubricant, and means for limiting the range of movement of said valve to prevent said valve from moving entirely from said seat.

In witness whereof, I hereunto subscribe my name this 20th day of July, 1927.

OSCAR U. ZERK.